(12) United States Patent
Uckun

(10) Patent No.: US 6,782,093 B2
(45) Date of Patent: Aug. 24, 2004

(54) GRAPHICAL METHOD AND SYSTEM FOR VISUALIZING PERFORMANCE LEVELS IN TIME-VARYING ENVIRONMENT

(75) Inventor: Serdar Uckun, Palo Alto, CA (US)

(73) Assignee: Blue Pumpkin Software, Inc., Sunnyvale, CA (US)

( * ) Notice: Subject to any disclaimer, the term of this patent is extended or adjusted under 35 U.S.C. 154(b) by 465 days.

(21) Appl. No.: 09/894,227

(22) Filed: Jun. 27, 2001

(65) Prior Publication Data

US 2003/0002653 A1 Jan. 2, 2003

(51) Int. Cl.$^7$ ................................................ H04M 3/00
(52) U.S. Cl. ........................... 379/266.06; 379/265.03; 379/265.06; 379/266.1
(58) Field of Search ................. 379/265.02, 265.03, 379/265.06, 265.08, 265.09, 266.06, 266.1

(56) References Cited

U.S. PATENT DOCUMENTS

| | | |
|---|---|---|
| 4,510,351 A | 4/1985 | Costello et al. |
| 5,111,391 A | 5/1992 | Fields et al. |
| 5,185,780 A | 2/1993 | Leggett |
| 5,195,172 A | 3/1993 | Elad et al. |
| 5,289,368 A | 2/1994 | Jordan et al. |
| 5,325,292 A | 6/1994 | Crockett |
| 5,369,570 A | 11/1994 | Parad |
| 5,477,447 A | 12/1995 | Luciw et al. |
| 5,481,667 A | 1/1996 | Bieniek et al. |
| 5,659,768 A | 8/1997 | Forbes et al. |
| 5,917,485 A | 6/1999 | Spellman et al. |
| 6,021,403 A | 2/2000 | Horvitz et al. |
| 6,021,428 A | 2/2000 | Miloslavsky |
| 6,044,355 A | 3/2000 | Crockett et al. |
| 6,081,592 A | 6/2000 | Battle |
| 6,259,776 B1 * | 7/2001 | Hunt ..................... 379/114.01 |
| 6,333,979 B1 * | 12/2001 | Bondi et al. ................ 379/219 |
| 6,542,156 B1 * | 4/2003 | Hong et al. .................. 345/440 |
| 6,603,854 B1 * | 8/2003 | Judkins et al. ......... 379/265.06 |
| 6,633,640 B1 * | 10/2003 | Cohen et al. .......... 379/265.03 |

FOREIGN PATENT DOCUMENTS

| | | |
|---|---|---|
| EP | 0 817 455 A2 | 1/1998 |
| EP | 0 863 650 A2 | 9/1998 |
| EP | 1 039 732 A2 | 9/2000 |
| EP | 1 162 814 A2 | 12/2001 |
| GB | 2 339 643 A | 2/2000 |
| WO | WO 00/08556 A1 | 2/2000 |

OTHER PUBLICATIONS

Cox, Dennis "Handling Multi–media Work" *a Pipkins White Paper*. hhtp://www.pipkins.com/articles/multimedia.asp (Mar. 12, 2001).

Pipkins, Inc. "Skill Set Scheduling" *a Pipkins White Paper*. http://www.pipkiins.com/articles/skillset.asp (Mar. 12, 2001).

Pipkins, Inc. "SkillSense ™ Scheduling" *a Pipkins White Paper*. http://www.pipkins.com/press/2000_3_skillsense.asp (Mar. 12, 2001).

* cited by examiner

*Primary Examiner*—Bing Bui
(74) *Attorney, Agent, or Firm*—Shemwell Gregory & Courtney LLP

(57) ABSTRACT

Presented is a method and system for visually depicting performance levels in a time-varying environment such as a workplace experiencing time-varied workloads. A call center is one example of such a workplace. One embodiment includes a graphical depiction with a reference time period, such as a work day, on a the horizontal axis. A vertical axis displays, for example, the length of time an incoming call must wait before being answered. As calls come into the call center a symbol is placed horizontally on the graph corresponding to the time during the reference time period that the call was received, and vertically according to the time the caller had to wait before a call center agent answered the call. Other information may also be superimposed on the graph, such as a call center service metric, and abandoned calls.

30 Claims, 3 Drawing Sheets

GRAPHICAL METHOD AND SYSTEM FOR VISUALIZING PERFORMANCE LEVELS IN TIME-VARYING ENVIRONMENT

FIELD OF THE INVENTION

The present method and system are in the field of performance measurement. More particularly, presented is a method and system for providing a visual representation of workplace performance.

BACKGROUND OF THE INVENTION

Today's workplaces are typically staffed on the basis of forecast workload. Correspondingly, there are performance expectations on how fast a workload is processed and services are provided. Emergency rooms, for example, are staffed on the basis of forecast patient load and expectations of how fast each patient needs to be treated. Loan offices are staffed on the forecast of financing needs of a community and the expectation of how long it should take for a loan to close. Likewise, call centers are staffed using forecasts of call volumes and service level expectations.

Performance expectations can take many forms. They can be expressed to a workplace as goals or standards and serve to motivate and discipline employees. Regardless of the basis, the establishment of such goals plays a critical role in any endeavor's success. As organizations strive to achieve these goals, they often establish metrics, or a system of measurements and standards designed to evaluate organizational performance. One such metric in call center operations measures the responsiveness of the center to incoming calls.

A performance metric entitled, service level, examines what percentage of calls are answered within a specified time limit. The longer the customer has to wait for the call center to respond the lower the service level. A typical example of a call center service level metric is to have eighty percent of the incoming calls answered within twenty seconds. But metrics are dynamic management tools that must be tailored to specific working environments. In the service industry the provided service identifies the competitive market. Evaluating a workplace's performance in providing a service can include several differing criteria. In the call center environment both the percentage of calls answered and the time taken by an agent to answer a call can vary depending on the needs and goals of the company. Likewise, the service level metric, which is a means to evaluate a center's performance, can vary from call center to call center. Another metric useful in call center management is the abandon rate, which specifies the percentage of callers who abandon their calls or hang up before they reach a representative.

While the service level and the abandonment rate are easily ascertainable statistics, they fail, standing alone, to quickly convey to the call center manager an indication of a customer's tolerance for delays in reaching an agent or an understanding of the customer's call center experience. Statistical data does not provide a means to describe the relationship between the amount of time a typical caller has to wait before reaching a representative and the volume of calls being received by the call center. Current methods fail to present any indication of how performance levels vary over a specified period of time. Furthermore, statistical data is by definition historical resulting in a deficit of any real-time or near real-time capability to monitor performance levels. Lacking an understanding and visualization of the overall customer experience as well as the fluctuations in forecast workload results in managers being ill equipped to motivate employees. Similarly, managers are ineffective at adjusting workplace procedures and schedules to better meet the metrics and increase overall productivity. Without the proper indication of performance levels, challenging yet ascertainable metrics are more difficult to design, often causing performance and revenue to suffer.

SUMMARY OF THE INVENTION

Presented is a system and method for visualizing performance levels of a workplace in a time-varying environment. One possible application for such a method and system is visualizing service levels and abandonment rates for call centers. In one embodiment a display includes a graphical depiction generated from statistical information regarding incoming call volume, call center responsiveness, and abandonment time. In one embodiment, a graph is created consisting of two axes. Depicted on the horizontal axis is a reference time period corresponding, in the call center example, to how long the call center is open. This reference time is typically the work day but can include any other reference time period that can enhance the call center manager's ability to evaluate the call center's performance. The vertical axis on the display represents response time, which in an embodiment applicable to the call centers is the time required for each call to be answered by an agent. For each call received by the call center during the reference time period a symbol is placed on the display according to values represented by these two axes.

The display aggregates the calls that a call center receives during the reference period and provides historical data for trend analysis. In another embodiment, different call centers' performance levels are overlaid onto a particular display using different symbols to illustrate relative performance levels. Superimposed on the display, in one embodiment, is a horizontal line depicting the service level metric. This metric represents the goal established by the organization to answer a certain percentage of calls within a certain time period. Similarly, calls that are abandoned by the caller are differentiated from calls answered by the call center to provide the call center manager an indication of caller patience as it varies during the time period.

BRIEF DESCRIPTION OF THE DRAWINGS

The present invention is illustrated by way of example in the following diagrams and flow charts in which like references indicate similar elements. The following diagrams and flow charts disclose various embodiments of the present invention for purposes of illustration only and are not intended to limit the scope of the invention.

DETAILED DESCRIPTION

Figure 1:
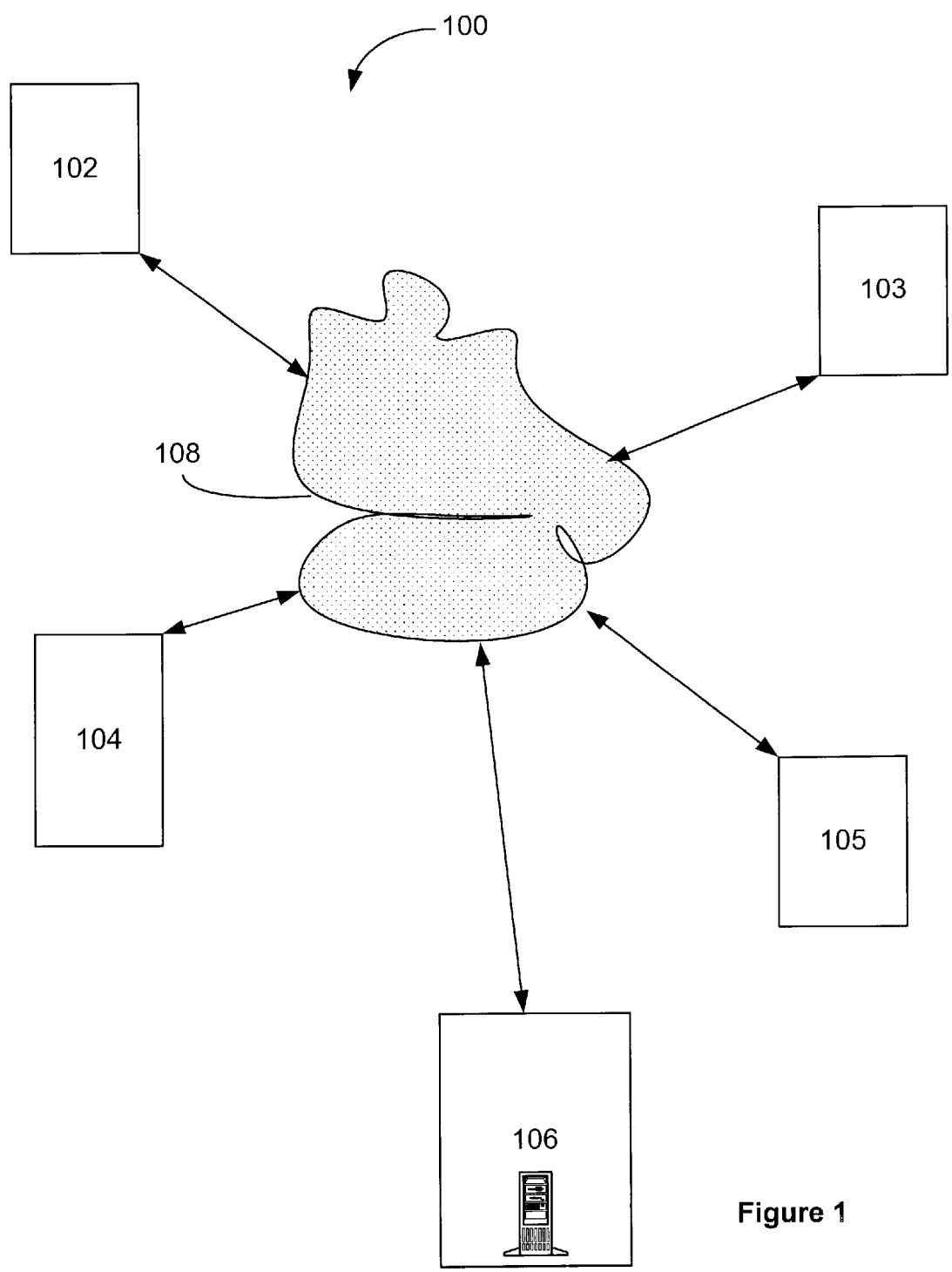
FIG. 1 is a block diagram of a network system for graphically depicting call center performance levels of an embodiment.

A system and method for depicting performance levels in complex environments are described. In the description that follows, numerous specific details are set forth in order to provide a thorough understanding of the present invention.

It will be evident, however, to one skilled in the art that the method and system presented may be practiced without these specific details.

Workplaces that deal with time-varying workloads typically use metrics to evaluate their performance. An embodiment of a method for visually depicting performance levels in a time-varied workplace uses a graph where the horizontal axis represents a reference time period, such as the daily hours of operation, and the vertical axis represents response time. The reference time period and response time can be varied to accommodate various industries. For example a hospital emergency room's reference time period may be a full 24 hour day while a bank loan office may be only from nine in the morning to four in the afternoon. Similarly, the response time can be defined to facilitate a manager's understanding of the workplace's performance. A metric corresponding to a particular response time can be depicted by a line superimposed on the graph. For each input, a symbol is placed on the graph corresponding to the appropriate position as defined by the response time and reference period. For example, a symbol representing the time that elapsed until a physician was able to see a non-critical patient at 3:00 AM in a hospital emergency room is placed on a graph and compared to a metric regarding desired response time for non-critical patients. Similarly the response time of an agent in a call center can be visualized using another embodiment of the claimed method.

A call center, sometimes referred to as a contact center, is an organization that answers and responds to telephone calls and other communication media from customers for one or more particular organizations. Call centers also respond to other customer contacts, such as e-mail, faxes, and voice over Internet protocol, and web chat. Such centers possess a variety of resources. A resource can be the equipment, the employees, the facilities, or any other asset that facilitates the business in achieving its purpose. In a call center the individual employees answering the calls are agents and each possesses a particular skill set. Each employee is therefore an example of a resource with specialized skills. For example, one agent may be able to respond to technical problems, another may specialize in billing questions, and still another may specialize in taking product orders. Each agent likely possesses multiple skill sets and a call center manager's challenge is to optimize the agents' tasks so as to maximize the utilization of these skill sets without compromising the functionality of the center, thus minimizing cost.

Call center managers must also strive to maximize productivity of the call center. A critical element of obtaining enhanced productivity is establishing challenging yet obtainable goals. Once established and conveyed to the call center agents, the call center manager must monitor and assess the center's performance and adjust resource allocation accordingly. An embodiment of a method for visually depicting performance levels in a time-varying environment can be used in the call center environment.

FIG. 1 is an embodiment of a system 100, for providing a graphical depiction of service levels preformed by a call center to aid a manager in assessing call center performance. The system includes multiple client computers 102–105, which are coupled to the server 106, through a network, 108. The network 108, can be any network, such as a local area network, a wide area network, or the Internet. The client computers each include one or more processors and one or more storage devices. Each of the client computers also includes a display device, and one or more input devices. All of the storage devices store various data and software programs.

In one embodiment, the method for providing a graphical depiction of performance levels is carried out on the system 100, by software instructions executing on one or more of the client computers 102–105. The software instructions may be stored on the server 106, or on any one of the client computers. For example, one embodiment presents a hosted application used by a call center of an enterprise that requires complex scheduling of many employees. The software instructions are stored on the server and accessed through the network by a client computer operator of the enterprise.

In other embodiments, the software instructions may be stored and executed on the client computer. A user of the client computer with the help of a user interface can enter data required for the execution of the software instructions. Data required for the execution of the software instructions can also be accessed via the network and can be stored anywhere on the network.

Figure 2:
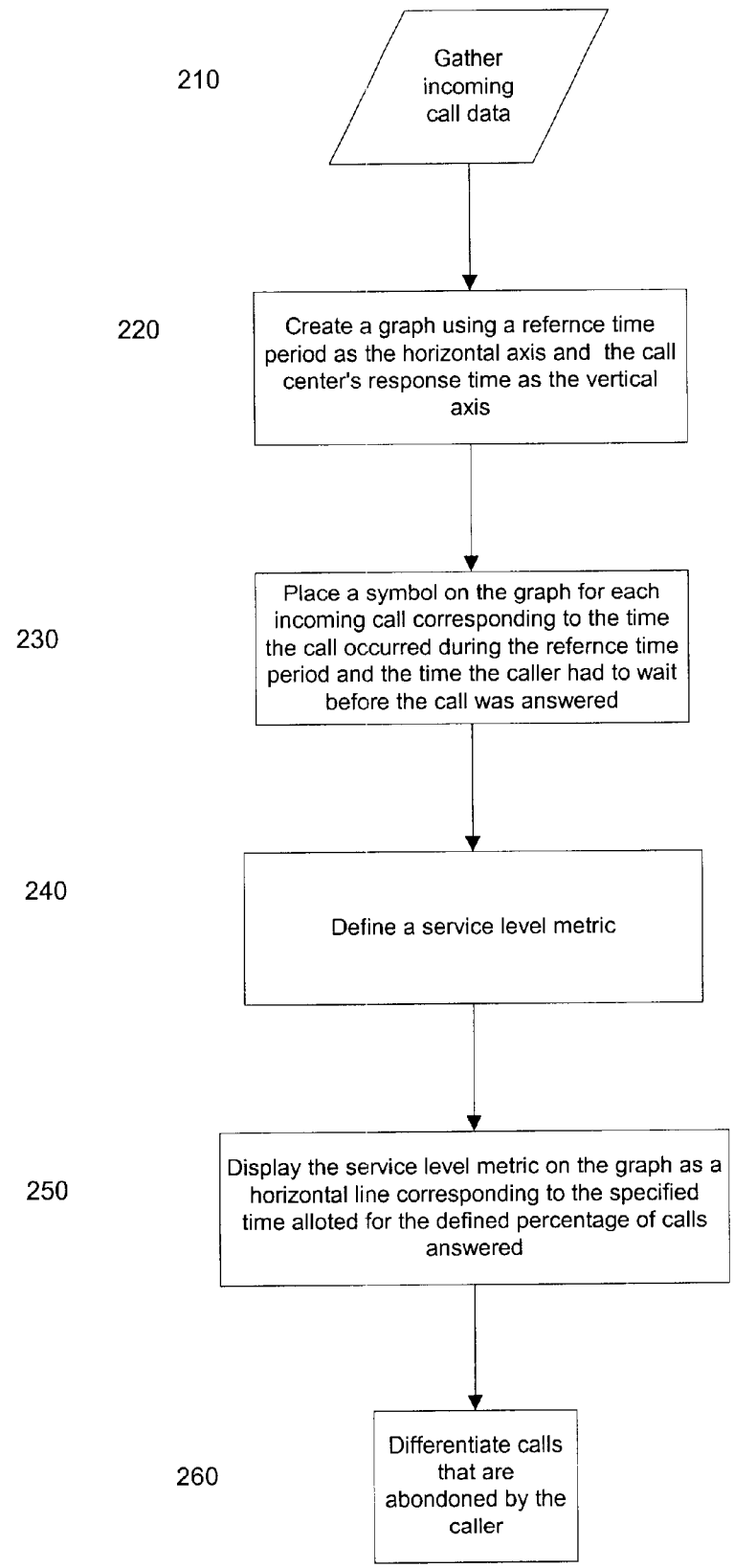
FIG. 2 is a block diagram of an embodiment of a method to graphically depict call center performance levels.

FIG. 2 is a flow diagram of an embodiment of a method for providing a visualization of service levels in a call center environment. As calls enter the call center, data is gathered concerning the type of call and the time that the call was placed 210. From that information a display is created consisting of a horizontal axis depicting a reference time such as but not limited to the work day and a vertical axis representing the response time including the elapsed time from when the call was placed until the caller reaches an agent 220. For each call that is assigned to a call center a symbol is placed on the display positioned horizontally according to the time during the reference period that the call was received and vertically according to the time that elapsed until the call was answered 230.

Associated with the display is at least one service level metric. The user can define the metric in a variety of ways such the percentage of calls that are desired to be answered within a certain period 240. For example, for a particular call center, the user may establish a performance or service level metric indicating that it is desirable for 80% of the calls to be answered within 20 seconds. This metric is conveyed on the display as a horizontal line positioned vertically at the time specified by which calls are to be answered 250. In the previous example a horizontal line would appear at the 20-second mark. As symbols are placed on the display calls that are abandoned by the caller are differentiated 260, from calls that are answered 230. Such differentiating means include but is not limited to altering the color and shape of the symbol.

Figure 3:
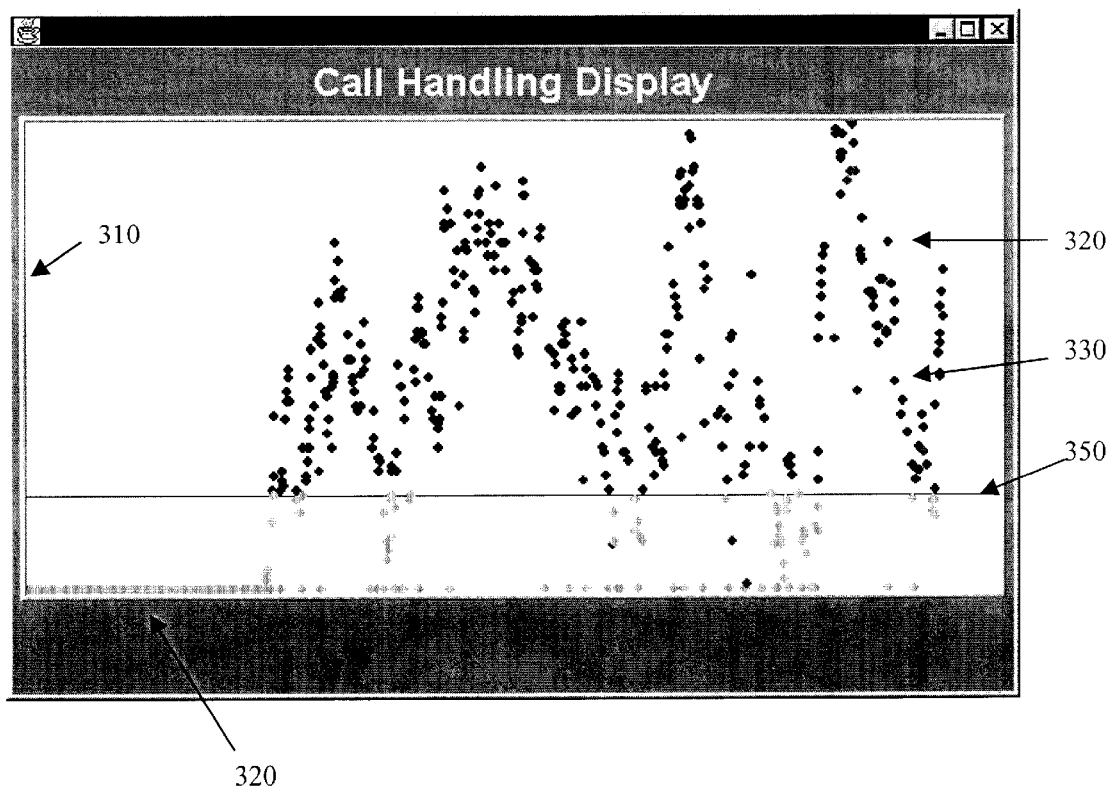
FIG. 3 is a flow diagram illustrating a method for visually depicting call center performance levels and abandonment rates of one embodiment of the present invention.

FIG. 3 is a display of an embodiment of a method for visualizing performance levels as typically seen on a user's computer screen. The display is defined by the vertical axis representing the response time until an incoming call is either answered or abandoned 310, and the horizontal axis represents a reference time period such as a typical work day 320. Symbols are located in the field of the display positioned horizontally and vertically as described herein 320. Calls that are abandoned are differentiated from calls that are answer by such means as a different shape or a different color 330. Finally, the performance level metric indicating the desired time limit by which a certain percentage of calls are answered is indicated by a horizontal line 350, positioned along the vertical axis according to the time limit imposed in the metric.

Calls coming into a call center are typically managed on a first come first served basis and being first functionally partitioned. Functional partitioning is done through an interactive process where the caller answers a few brief questions to better direct the call to the call center possessing the expertise that the caller desires. Calls that require an agent with a certain set of skills are directed to agents possessing those skills. Once a particular skill set has been identified calls are placed in a queue and answered on a first come first serve basis.

The time that a caller waits in the queue before being answered fluctuates over the reference time period and between specialties of the agents. Organizations develop metrics to evaluate if the period of waiting meets the organization's performance goals. As described herein, a typical call center service level goal can be to answer a certain percentage of the incoming calls within a fixed time of their arrival. To depict the ability or inability of the call center to meet these goals a visual display can be generated. As the day progresses a symbol can be placed on the graph representing each call that the call center receives. The symbol is positioned horizontally corresponding to the time that the call was placed and vertically according to the time that the caller had to wait before an agent answered the call or the caller hung up. Thus the call center manager can, in one embodiment, gain historical information regarding the call center's performance as well as real time data concerning agent workload.

The display can immediately indicate periods of increased call volume or density as well as the inability of the call center to adequately handle the calls. This information can be utilized to alter the manning schedule or allocation of incoming calls to this particular call center. For example a visual representation of service levels may indicate that the call center routinely experiences an excessive amount of calls between 1 and 2 PM where the agents fail to meet an established metric of answering 80% of the calls in 20 seconds. Knowing this information, the call center manager can rearrange the lunch schedule or even find temporary manning to ensure resources are on hand to respond to the increased volume of work.

In an additional embodiment, the display conveys historical data to the call center manager to aid in establishing future metrics and evaluating center performance. Rather than displaying the published service level metric, the display can display time that a given percentage of callers had to wait prior to talking to an agent. For example, using historical data for a certain time period a call center manager could observe that on average 80% of the calls were answered within 45 seconds instead of the desired 20. In the alternative a metric could be displayed indicating what percentage of calls were answered in 20 seconds. Thus the graph could convey to the call center manager a plurality of tools to aid in fostering productivity.

In another embodiment, multiple performance level metrics of an organization can be superimposed to give the manager immediate feedback if the workplace is meeting organizational goals. Using the metrics as a guide, the manager can initiate changes in the staffing of the workplace to decrease the peaks and valleys of the workplace's performance.

A further embodiment of the claimed invention enables, another aspect of call center operations, the presence of abandoned calls, to be placed in concert with the visual representation of call center service levels. Along with symbols indicating when agents answer calls, calls that are abandoned by the caller can also be displayed, differentiated from calls answered by agents by using a symbol of a different color or shape. This can provide the call center manager feedback regarding the patience of the caller and how the patience level of callers varies throughout the day.

As mentioned herein, a visual depiction of incoming calls to a service center can aid a call manager in scheduling resources to meet organizational goals. In another embodiment of the claimed invention, a method for visualizing performance levels in a time-varied environment can be coupled with a scheduling process to ensure accurate and efficient manning. For example, the depiction of incoming calls for a reference time period can be stored and aggregated statistically to gain a historical account for how work volume varies over a particular length of time. The information can be utilized to more effectively schedule call workplace resources.

While an embodiment described herein provides a historical record of performance, another embodiment includes a real-time display of performance. As the reference time period elapses, a typical work day for example, the graphical interface can be updated at specific intervals up to and including on a real-time basis. This would provide the current workplace manager real-time information on the performance of the workplace and enable performance and resource parameters adjustments according to real-time events. For example a sudden spike in calls at a call center may result in an earlier than normal cancellation of a break period or an adjustment of a scheduled meeting.

Using different symbols or colors to aid in differentiation and comparison of multiple work centers is another embodiment of the claimed method and system. Data from numerous work centers can be aggregated and displayed on one graph to benchmark performance of one work place against another. In one embodiment different colors can be used to differentiate different work centers and the size of the symbols can be used to represent the volume or density of work. Another version can display lines indicating average performance over time where the color indicates the work center's identity and the width of the line represents the density of work at a particular time during the reference period.

The particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for visualizing performance levels in a workplace experiencing time-varying workloads comprising;

conveying visually a relationship between at least one predefined performance metric and at least one provided service;

displaying a symbol representing the predefined performance metric;

displaying a symbol representing a relationship between the at least one provided service, at least one response time period, and at least one reference time period.

2. The method of claim 1, wherein conveying includes using a graph comprising a plurality of axes, including a horizontal axis representing the at least one reference time period and a vertical axis representing the at least one response time period.

3. A method for visualizing performance levels over time in a call center comprising:

conveying visually a relationship between at least one predefined performance level metric and at least one incoming call, including displaying the predefined performance level metric;

displaying a symbol representing a relationship between an at least one incoming call answered by a call center agent and the predefined performance level metric; and displaying a symbol representing a relationship between an at least one incoming call abandoned by a caller and the predefined performance level metric.

4. The method of claim 3, wherein the predefined performance level metric is a time period for responding to an incoming call.

5. The method of claim 3, wherein the symbol representing the at least one incoming call answered by a call center agent and the symbol representing the at least one incoming call abandoned by a caller are differentiated.

6. A method for visualizing a call center's performance comprising:

conveying visually a relationship between at least one performance level metric, at least one incoming call, at least one reference time period and at least one response time period; and displaying the relationship using a symbol to represent the at least one incoming call.

7. The method of claim 6, wherein conveying includes using a graph comprising a plurality of axes, including a horizontal axis and a vertical axis.

8. The method of claim 7, wherein the horizontal axis of the graph represents the at least one reference time period and the vertical axis of the graph represents the at least one response time period until the at least one incoming call is answered.

9. The method of claim 8, further comprising;

displaying a symbol representing an elapsed time for the at least one incoming call to be answered by a call center agent;

displaying a symbol representing the elapsed time for the at least one incoming call to be abandoned by a caller;

displaying the at least one performance level metric;

differentiating the symbol representing the elapsed time for the at least one incoming call to be answered by a call center agent from the symbol representing the elapsed time for the at least one incoming call to be abandoned by a caller.

10. The method of claim 6, wherein conveying includes placing all the incoming calls received by a call center during the reference time period on the same graph.

11. The method of claim 6, wherein the at least one performance level metric includes a specific percentage of incoming calls to be answered within a specified time.

12. The method of claim 6, wherein displaying includes providing historical statistical data.

13. The method of claim 6, where conveying occurs on a real-time basis.

14. A method for visualizing service levels in a call center comprising:

conveying visually a relationship between at least one reference time period and at least one incoming call;

displaying a first symbol representing the time elapsed until the at least one incoming call is answered by a call center agent;

displaying a second symbol representing the time elapsed until the at least one incoming call is abandoned by a caller; and differentiating between the first symbol and the second symbol.

15. The method of claim 14, wherein displaying includes a service level metric indicating a specific percentage of the incoming calls to be answered within a specified time.

16. The method of claim 15, wherein conveying includes using a graph comprising a horizontal axis and a vertical axis, the horizontal axis representing the at least one reference time period and the vertical axis representing the time elapsed until the at least one incoming call is answered by the call center agent.

17. The method of claim 15, wherein displaying a second symbol includes correlating the second symbol to the time during the at least one reference time period when the call occurred.

18. The method of claim 15, wherein displaying a first symbol includes correlating the first symbol to the time during the at least one reference time period when the call occurred.

19. The method of claim 15, wherein conveying includes depicting a performance level metric.

20. The method of claim 15, wherein conveying occurs on a real time basis.

21. A method for providing a visual indication of performance levels over time in a call center comprising:

conveying visually a relationship between at least one reference time period, at least one incoming call, and at least one predefined performance level metric;

displaying a symbol representing the elapsed time until the at least one incoming call is answered by a call center agent;

displaying a symbol representing the elapsed time until the at least one incoming call is abandoned by the caller, wherein the symbol representing the at least one incoming call abandoned by a caller is differentiated from the at least one incoming call that is answered by a call center agent; and displaying the performance level metric, wherein the performance level metric includes a specific percentage of incoming calls to be answered within a specified time.

22. The method of claim 21, where conveying occurs on a real-time basis.

23. A computer-readable medium for visualizing a call center service level over time comprising instructions which, when executed in a processing system, causes the system to:

convey visually a relationship between at least one reference time period, at least one service level metric, and at least one incoming call;

display the at least one service level metric;

display a symbol representing the elapsed time until the at least one incoming call is answered by a call center agent;

display a symbol representing the elapsed time until the at least one incoming call is abandoned by the caller; and differentiate the symbol representing the at least one incoming call abandoned by the caller from the at least one incoming call that is answered by the call center agent.

24. A system for visualizing service levels in a call center comprising at least one server, coupled among at least one storage device and at least one client processor through a network, wherein the storage device stores instructions that, when executed, causes the at least one client processor to gather data concerning incoming calls to a call center, create a visual display conveying the relationship between a reference time period, a predefined service level metric, and at least one incoming call, display a symbol representing the elapsed time until the at least one incoming call is answered by a call center agent, display a symbol representing the elapsed time until the at least one incoming call is abandoned, and differentiate between the symbol representing the at least one incoming call answered by the call agent and the symbol representing the at least one incoming call that is abandoned.

25. A computer readable medium for visualizing performance levels of a workplace experiencing time varying workloads comprising instructions which, when executed on a processing system, causes the system to:

convey visually a relationship between at least one predefined performance metric and at least one provided service;

display a symbol representing the predefined performance metric;

display a symbol representing a relationship between the at least one provided service and the predefined performance metric; and display a symbol representing a relationship between the at least one provided service, an at least one response time period and an at least one reference time period.

26. A system for visualizing performance levels in a workplace with time varying workloads comprising at least one server coupled at least one storage device and at least one client processor, wherein the storage device stores instructions that, when executed, causes the at least one client processor to:

convey visually a relationship between at least one predefined performance metric and at least one provided service display a symbol representing the predefined performance metric;

display a symbol representing a relationship between the at least one provided service and the predefined performance metric; and display a symbol representing a relationship between the at least one provided service, at least one response time period and at least one reference time period.

27. A method for visualizing performance levels in a workplace with time-varying workloads comprising:

conveying visually a relationship between at least one predefined performance metric and at least one provided service; and displaying a first symbol representing a relationship between the at least one provided service, at least one response time period, and at least one reference time period, wherein the delivered volume of the at least one provided service is indicated by altering the symbol.

28. The method of claim 27, wherein conveying includes using a graph comprising a plurality of axes wherein a vertical axis represents a response time period and a horizontal axis represents a reference time period.

29. The method of claim 27, wherein conveying occurs on a real-time basis.

30. The method of claim 27, wherein conveying includes: averaging the relationship between the at least one provided service, the at least one response time and the at least one reference time period over a plurality of reference time period of at least one workplace;

displaying a second symbol representing the average of the relationship between the at least one provided service, the at least one reference time period and the at least one response time of at least one workplace;

aggregating the second symbol at a plurality of workplaces on the same visual display wherein relative performance of such workplace is apparent.

* * * * *